(No Model.)
J. W. RUNYAN.
PUMP DRIVER.
No. 315,445. Patented Apr. 7, 1885.
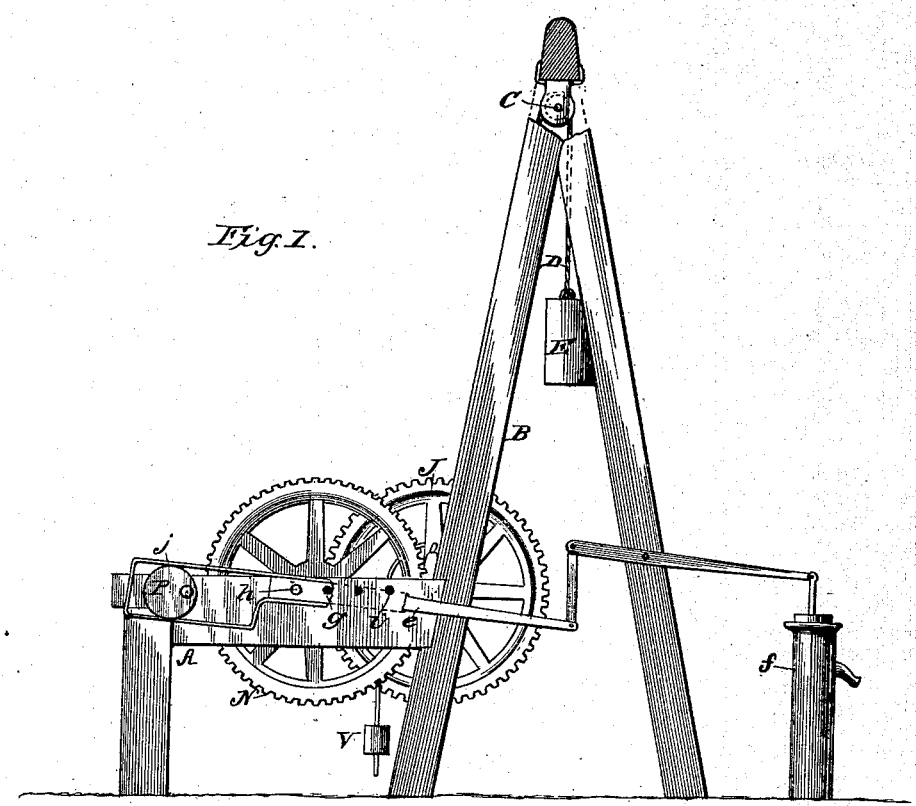
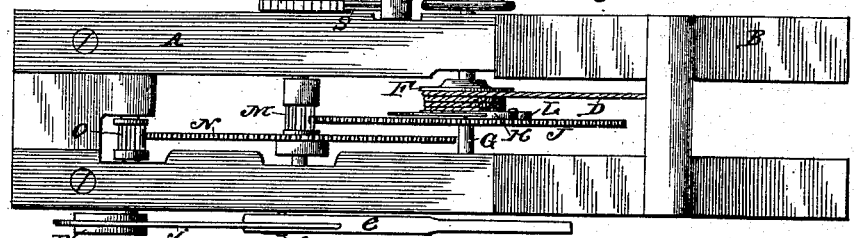
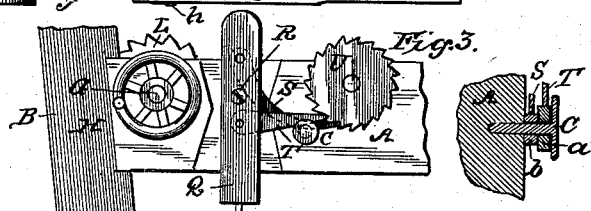
WITNESSES: INVENTOR:
Fred. G. Dieterich John W. Runyan
W. X. Stevens. BY Munn & Co
ATTORNEYS.

UNITED STATES PATENT OFFICE.

JOHN WESLEY RUNYAN, OF CATAWBA, OHIO.

PUMP-DRIVER.

SPECIFICATION forming part of Letters Patent No. 315,445, dated April 7, 1885.

Application filed February 13, 1885. (No model.)

*To all whom it may concern:*

Be it known that I, JOHN WESLEY RUNYAN, a citizen of the United States, residing at Catawba, in the county of Clark and State of Ohio, have invented certain new and useful Improvements in Pump-Drivers, of which the following is a description.

This invention relates to that class of devices which are used for storing and transmitting power; and its object is to provide means whereby an old-styled clock-work and weight may be utilized to work a pump.

To this end my invention consists in the construction and combination of parts forming a pump-driver, hereinafter described and claimed, reference being had to the accompanying drawings, in which—

Figure 1 is a front elevation. Fig. 2 is a plan view of my invention, and Fig. 3 is a detail view of the clock-escapement.

A represents the frame in which the clock-gearing is mounted.

B is a derrick supporting a pulley, C, over which the rope D runs.

E is the driving-weight, which may be of any suitable weight, even to hundreds of pounds. One end of the rope D is attached to the weight to carry it, and the other end is wound upon a drum, F, which is secured upon a shaft, G, that is journaled in the frame A.

H is a crank on the shaft G, by which the drum F may be turned to wind up the weight E.

J is a gear-wheel mounted to revolve on the shaft G, and provided with a pawl, K, to engage a ratchet-wheel, L, which is attached to or a part of the drum F. The teeth of the ratchet are so faced as to turn freely in the direction to wind up the weight E; but when the crank H is released, so that the weight is free to descend, the ratchet immediately engages the pawl K and revolves the wheel L.

M is a pinion driven by wheel L.

N is a spur-wheel secured to the same shaft as pinion M, and gearing into another pinion, O, which is secured upon the shaft of crank P. Thus the slow descent of the weight operates the crank rapidly.

To regulate the speed of the crank at will, I provide a pendulum, Q, pivoted at R to the frame A.

S and T are pawls, pivoted at one end of each to the pendulum-bar, one pawl-pivot being above the pendulum center R and the other below it.

U is a ratchet-wheel upon the shaft of the pinion M. The pawls S and T alternately engage the ratchet U at such a rate of speed as the swing of the pendulum permits, thus regulating the speed of the train of gearing to a given rate. This rate may be established at any time by fixing the pendulum-bob V upon the pendulum-rod at the proper distance from its center of oscillation to produce the rate of speed required.

In order that the two pawls S and T may both act upon the ratchet-wheel U to intercept its free revolution, I have curved the upper pawl, S, to bring it tangent to the ratchet at nearly the same point in the circumference of the ratchet, and I have provided a pair of guide-rollers, $a\,b$, upon which the free ends of the pawls may be supported as they advance and recede. The rollers are to lessen friction. The two rollers are journaled upon a stud, $c$, which is fixed to the frame A, and the outer roller, $a$, is larger than the inner roller, $b$, to serve as a wall to guide the pawl S in its own proper path, and to prevent the points of the pawls becoming crossed, so as to interfere with their action.

$e$ is the lever of the pump $f$, and it is provided with a series of holes, $g$, any one of which may be mounted on a stud, $h$, which is removably secured in one of a series of holes, $i$, in the frame A. The lever $e$ engages the crank P by means of a loop, $j$, which permits the crank to traverse to and from the center of the lever freely, but at the same time the lever receives vertical motion from the crank and transmits it to the pump. The series of holes $g$ in the lever $e$ correspond to the series of holes $i$ in the frame A, so that when it is desired to change the leverage of the pump by moving the stud $h$ to a different hole $g$ in the lever, the stud may also be changed to a corresponding hole $i$ in the frame, so as not to derange the position of the lever relative to the crank and to the pump. Below the derrick may be a well of any required depth to give sufficient space for the weight to descend.

What I claim as my invention, and desire to secure by Letters Patent, is—

The combination of the pump $f$, the lever $e$ therefor, the crank P, connected with lever $e$, the weight E, the train of gearing connecting the weight and crank, the ratchet U, upon a shaft of the train of gearing, the pendulum Q, the frame A, the pivot R, hanging the pendulum on the frame, the pawl S, pivoted to the pendulum above its center and curved near its point, the pawl T, pivoted to the pendulum below the center of the latter, the stud $c$, fixed in the frame, and the rollers $a$ and $b$, journaled on this stud, the pawls S and T, supported upon the rollers, substantially as and for the purpose specified.

JOHN WESLEY RUNYAN.

Witnesses:
J. W. BURNS,
C. E. RUNYAN.